US 9,892,205 B2

United States Patent
Leece

(10) Patent No.: US 9,892,205 B2
(45) Date of Patent: Feb. 13, 2018

(54) DECLARATIVE SHOW AND HIDE ANIMATIONS IN MARKUP LANGUAGES

(75) Inventor: Mark Leece, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 746 days.

(21) Appl. No.: 13/531,772

(22) Filed: Jun. 25, 2012

(65) Prior Publication Data

US 2013/0346851 A1 Dec. 26, 2013

(51) Int. Cl.
*G06F 17/30* (2006.01)

(52) U.S. Cl.
CPC .............................. *G06F 17/30905* (2013.01)

(58) Field of Classification Search
USPC ................................................. 715/234–237
See application file for complete search history.

(56) References Cited

U.S. PATENT DOCUMENTS

| 8,775,923 B1* | 7/2014 | Kroeger et al. ............... 715/234 |
| 2009/0228784 A1 | 9/2009 | Drieu et al. |
| 2013/0132818 A1* | 5/2013 | Anders et al. ................ 715/234 |

OTHER PUBLICATIONS

David Flanagan; JavaScript The Definitive Guide; Jan. 2002; O'Reilly & Associates; pp. 192-193, 274-276, and 319-341.*
David Rousset; Introduction to CSS3 Animations; Dec. 5, 2011; MSDN Blog; pp. 1-9.*
Chris Bewick; HTML5 Custom Data Attributes (data-*); May 27, 2010; HTML5 Doctor; pp. 1-11.*
Podwysocki et al.; Asynchronous Programming in JavaScript with "Promises;" Sep. 11, 2011; MSDN Blogs; pp. 1-11.*
Jackson et al.; CSS Animations Module Level 3; Mar. 20, 2009; W3C; pp. 1-17.*
How Browsers Work; Feb. 20, 2010; taligarsiel.com; pp. 1-27.*
What is a "utility" function; 2009; Yahoo Answers; p. 1.*
DOM Element Methods; Jun. 17, 2009; JavaScript Kit; pp. 1-6.*
Expando Property; Apr. 13, 2010; Microsoft Developer Network; pp. 1-3.*
What does "wrapping" mean in programming?; Mar. 16, 2012; Stack Overflow; p. 1.*
"Animated Transitions Example", Retrieved at <<http://knockoutjs.com/examples/animatedTransitions.html>>, Oct. 23, 2010, pp. 3.

(Continued)

*Primary Examiner* — Andrew Dyer
(74) *Attorney, Agent, or Firm* — Karin L. Williams; Mayer & Williams PC

(57) ABSTRACT

An arrangement for enabling declarative show and hide animations in web-based applications is provided in which expando attributes associated with HTML elements are utilized to define CSS level 3 ("CS3") animations that are executed when an element is shown or hidden. A set of utility functions, which wrap standard DOM (Document Object Model) element methods supported in JavaScript, are employed to show, hide, add, and remove elements from the DOM tree and invoke an algorithm when used. The algorithm traverses the DOM tree for HTML elements that have the show and hide expando attributes and automatically executes the associated animations.

16 Claims, 7 Drawing Sheets

(56) References Cited

OTHER PUBLICATIONS

"Welcome to Channel 5—the home for HTML Developers!", Retrieved at <<http://devworks.thinkdigit.com/channel5/blogs/Introduction-to-CSS3-Animations_8717.html>>, Feb. 9, 2012, pp. 13.
Glazebrook, Rob, "Show/Hide Content with CSS and JavaScript", Retrieved at <<http://www.cssnewbie.com/showhide-content-css-javascript/>>, May 5, 2008, pp. 30.
"How to Hide, Show, or Toggle Your div with jQuery", Retrieved at <<http://www.randomsnippets.com/2011/04/10/how-to-hide-show-or-toggle-your-div-with-jquery/>>, Apr. 10, 2011, pp. 42.
"CSS: Animation Using CSS Transforms", Retrieved at <<http://www.the-art-of-web.com/css/css-animation/>>, Dec. 16, 2008, pp. 10.
Cancarevic, Dejan, "Simple Show/Hide with CSS", Retrieved at <<http://stylizedweb.com/2008/09/10/simple-showhide-with-css/>>, Sep. 10, 2008, pp. 7.
The American Heritage Dictionary of the English Language, 5th edition (2016), term "utility program" (2 pages total).

\* cited by examiner

FIG. 4

```
@-ms-keyframes fadeInKeyFrames
{
  0%
  {
    opacity: 0;
    -ms-transform: translatex(0);
  }
  100%
  {
    opacity: 1;
    -ms-transform: translatex(0);
  }
}

.fadeIn
{
  -ms-animation-name: fadeInKeyFrames;
  -ms-animation-duration: 167ms;
  -ms-animation-timing-function: linear;
  -ms-animation-fill-mode: both;
}
```

FIG. 5

```
<div data-ent-showanimation = "fadeIn">
  ...
</div>
```

Function: Execute show animations // Takes a DOM element and returns a promise that is completed when the last animation show completes Create returned promise // This is 'completed' when the last animations completes // remove any existing hide animation classes, so all associated CSS3 animation
// and transition names are removed
for dom element, and all descendant elements, that contain a hide animation attribute
   with all the class-names in the attribute value
      remove class-name from element // add any show animation classes, indirectly setting CSS3 animation and/or transition names
// on the elements
for domElement, and all descendant elements, that contain a show animation attribute
   if element is visible
      with all the class-names in the attribute value
         add class-name to element // Complete promise when last animation completes
      create map containing all the CSS3 animation-names
      attach animation-end listener to element that
         removes CSS3 animation-name from map
         complete promise when the map is empty
         removes listener create map containing all the CSS3 transition-names
      attach transition-end listener to element that
         removes CSS3 transition-name from map
         complete promise when the map is empty
         removes listener // complete returned promise if not animations were executes
if no animations
   complete promise

DECLARATIVE SHOW AND HIDE ANIMATIONS IN MARKUP LANGUAGES

BACKGROUND

The fifth revision of the HyperText Markup Language, named "HTML5," is formally defined by an international standards body known as the World Wide Web Consortium ("W3C"). HTML5 includes more than 100 specifications that relate to the next generation of Web technologies. HTML5 describes a set of HTML, CSS (Cascading Style Sheets), and JAVASCRIPT specifications configured to enable designers and developers to build the next generation of web sites and applications.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An arrangement for enabling declarative show and hide animations in web-based applications is provided in which expando attributes associated with HTML elements are utilized to define CSS level 3 ("C553") animations that are executed when an element is shown or hidden. A set of utility functions, which wrap standard DOM (Document Object Model) element methods supported in JAVASCRIPT, are employed to show, hide, add, and remove elements from the DOM tree and invoke an algorithm when used. The algorithm traverses the DOM tree for HTML elements that have the show and hide expando attributes and automatically executes the associated animations.

In various illustrative examples, the show and hide animations may be specified within the HTML markup itself with data-ent-showanimation and data-ent-hideanimation expando attributes using a specific syntax. The attribute value contains a space/comma separated list of class names, enabling an animation to be defined using a single CSS class-name that encapsulates the CSS3 animation or transition name/properties.

Advantageously, by using HTML element attributes to define the animations to be executed when an element is shown or hidden, application designers are advantageously enabled with the capability to specify CSS3 animations within the HTML markup itself. This capability can be expected to dramatically simplify the creation of web-based experiences for users.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

FIG. 4 shows an illustrative example of how a CSS class encapsulates a CSS3 animation;

FIG. 5 shows HTML syntax that uses the CSS class as a value for an expando attribute;

FIG. 8 shows pseudo code of an illustrative algorithm that may be used to automatically execute show and hide animations.

Like reference numerals describe like elements in the drawings.

DETAILED DESCRIPTION

Animations are increasingly used within user experiences to help reinforce and develop the user's mental model of a software product's features and functionality. Typical examples include zooming between pages to reinforce navigation, and using motion to draw attention to key pieces of information when a page is displayed. The present arrangement addresses the problem that animations in HTML5 and CSS3, executed when an element is shown or hidden, or added to or removed from the DOM tree, most often need to be applied in JAVASCRIPT, which typically requires a software developer to code.

Figure 1:
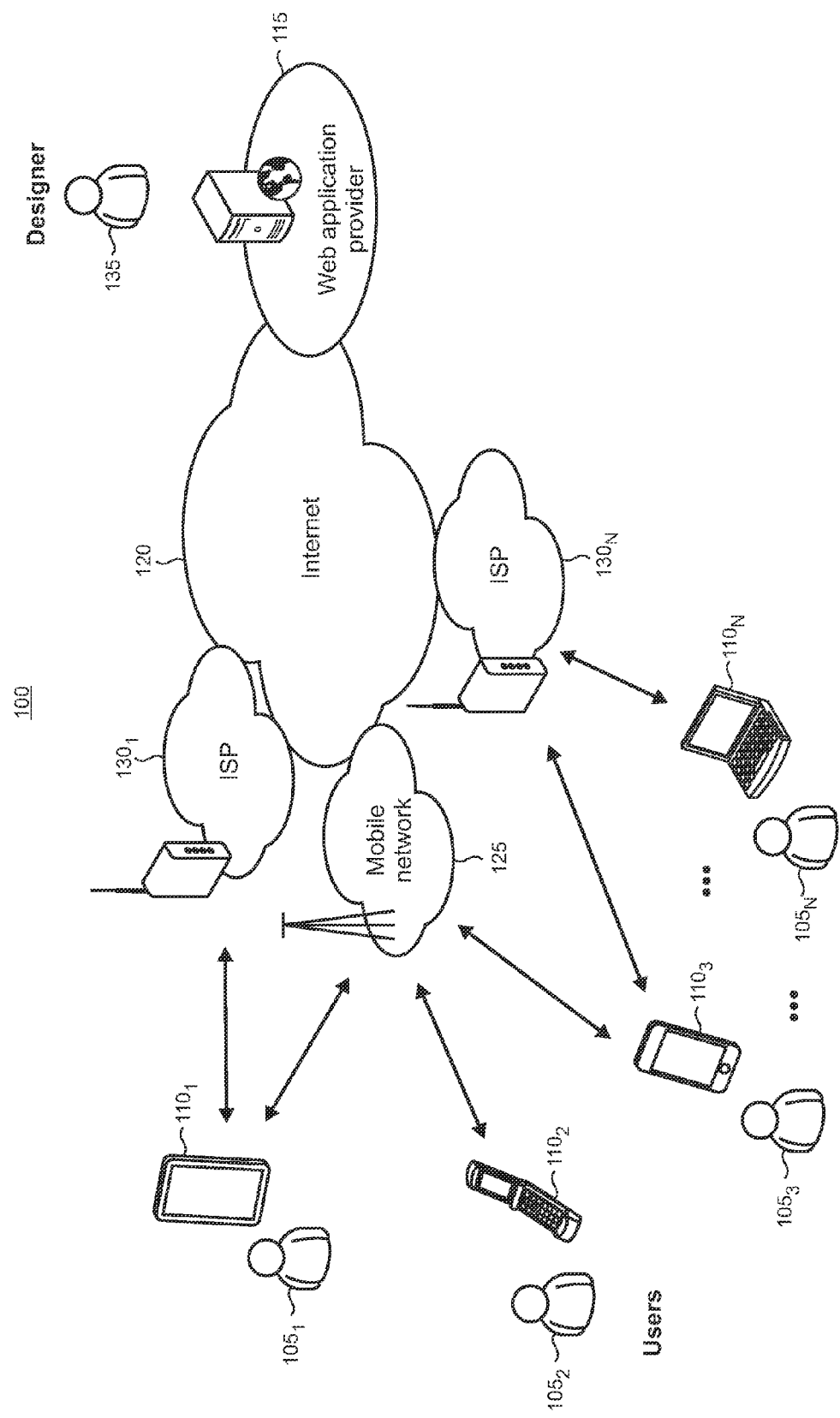
FIG. 1 shows an illustrative computing environment in which the present declarative show and hide animations may be implemented.

Turning now to the drawings, FIG. 1 shows an illustrative computing environment 100 in which the present declarative show and hide animations may be implemented. In the environment 100, a number of web application users 105 employ respective computing devices 110 to access web-based resources including a web application provider 115 over the Internet 120. The computing devices 110 can comprise a variety of platforms having various features and functionalities (where not all of such platforms are illustrated in FIG. 1) including, for example, mobile phones, smart phones, personal computers ("PCs"), ultra-mobile PCs, PDAs (personal digital assistants), e-mail appliances, digital media players, tablet computers, handheld gaming platforms and consoles, notebook and laptop computers, Internet-connected televisions, set-top boxes, GPS (Global Positioning System) and navigation devices, digital cameras, and devices having various combinations of functionalities provided therein. It is emphasized, however, that the preceding list is intended to be illustrative, and that the present arrangement can be expected to be utilized on any of a variety of platforms that support HTML5 functionalities or a subset thereof.

Typically, the computing devices 110 will have some form of network connectivity feature, either directly or through an intermediary device (e.g., an Internet-connected personal computer), as well as a web browser or application or embedded features that provide similar functionality which operates on the device and supports user interactivity through a display and input device such as a touchscreen, keypad, pointing device, and the like. As shown in FIG. 1, the computing devices 110 may access the Internet 120 and the web application provider 115 using a mobile network 125, or through Internet Service Providers ("ISPs") 130, or using both in some cases. The web application designer 135 works with the provider 115, in this illustrative example, to design next generation web technologies including application and websites that leverage the capabilities of HTML5.

Figure 2:
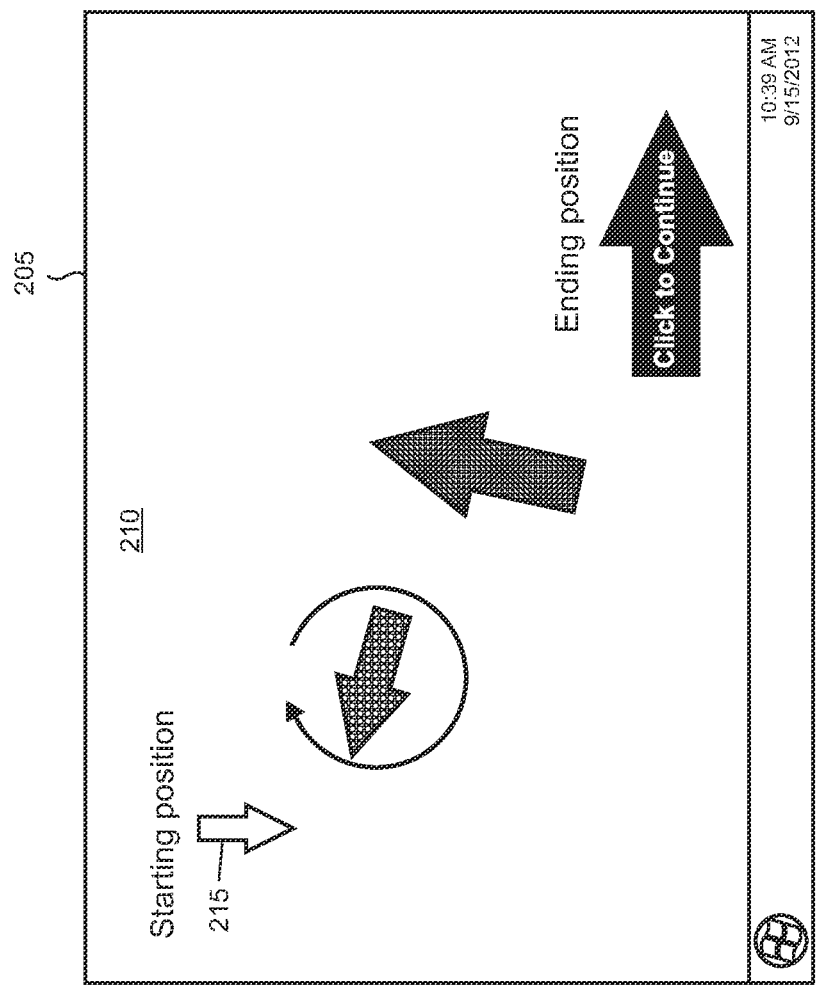
FIG. 2 shows an illustrative browser window supporting a user interface to an application that uses animations supported by CSS3.

FIG. 2 shows an illustrative browser window 205 supporting a user interface to a web-based application 210 hosted by the provider 115 (FIG. 1) that uses animations supported by CSS3. CSS3 Animations are defined by the W3C in the CSS Animations Module Level 3 specification. Animations are similar to transitions under CSS3 in that they animate elements as they change position, size, color, and opacity. Elements can also rotate, scale, translate, and so on. As with transitions, a designer can specify timing functions to control the rate of progression of an animation.

Values for the animating properties can be specified at various points during the animation. This enables designers to define the behavior of an animation not only at the beginning and end of the animation, but in between as well. Animations can also have iterations and reverse-direction capability, and can be given the ability to pause and resume. CSS3 animations can thus provide a wide variety of possibilities for creating rich and compelling web experiences.

This particular example shows a CSS3 animation that is part of the application behavior in which a button element 215 shaped like an arrow appears and then moves from the upper left of the window 205 to the lower right while rotating (i.e., spinning), growing larger, and changing color. The designer 135 (FIG. 1) can utilize such animation to draw the user's attention to the button 215 in a visually appealing way.

Figure 3:
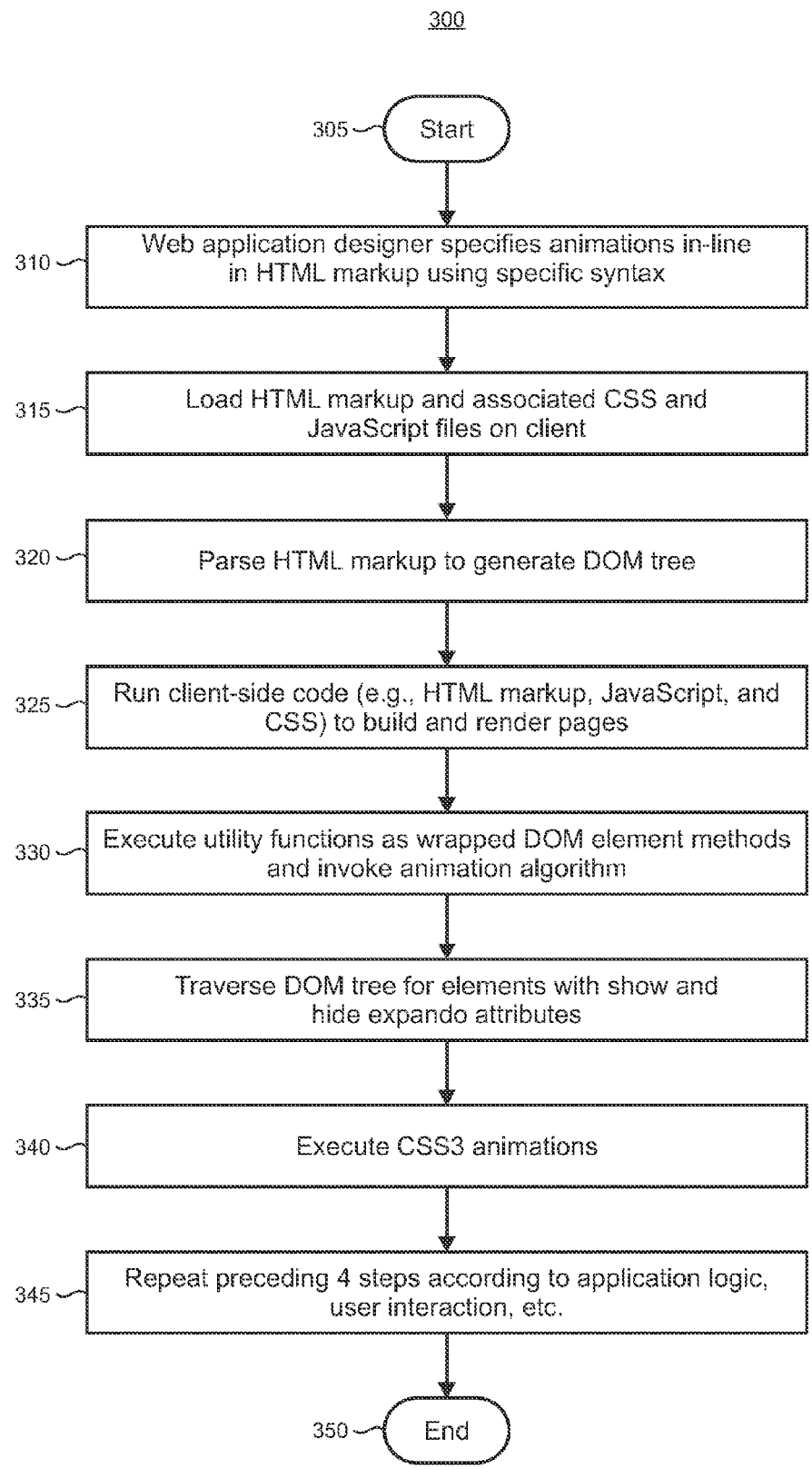
FIG. 3 shows a flowchart of an illustrative method for declaratively showing and hiding animations.

FIG. 3 shows a flowchart of an illustrative method 300 that the designer 135 may utilize for declaratively showing and hiding animations used in the web-based application 210 (FIG. 2). In this example, the web-based application 210 uses a combination of HTML, CSS, and JAVASCRIPT which respectively provide the structure, presentation, and behavior for the application 210. The method starts at block 305.

At block 310 the designer 135 may specify CSS3 Animations in-line with HTML markup itself. Such declarative specifying utilizes HTML element attributes to define the animations which will execute when an element is shown or hidden. This paradigm thus separates the declaration of animations from their invocation and utilizes a specific syntax in the HTML markup that applies custom properties to elements using the expando attributes data-ent-showanimation and data-ent-hideanimation:
data-ent-showanimation|data-ent-hideanimation="class-name [space|semicolon class-name]*"
where the attribute value contains a space/comma separated list of class names, where class-name is a CSS class that encapsulates the CSS3 animation or transition name/properties.

FIG. 4 shows an illustrative example of how a CSS class encapsulates a CSS3 animation. In this example, CSS animation code 410 uses the MICROSOFT-specific vendor prefix "ms" for the @keyframes rule sets in CSS3 that may be utilized, for example, with METRO™ style applications ("apps") that run on WINDOWS® 8 Release Preview devices. A keyframe defines property values during an animation cycle that are applied by the animation engine. As shown in FIG. 4, the CSS animation code 410 implements an animation to fade in an element from 0 to 100% opacity in a linear manner over a time period of 0.167 seconds. FIG. 5 shows an illustrative example of HTML markup 510 specifying the fade in animation that utilizes the CSS class as a value for the expando attribute data-ent-showanimation using the syntax described above.

Returning to FIG. 3, at block 315, the HTML markup and associated CSS and JAVASCRIPT files are typically loaded at the client device for client-side processing. However, in some implementations, some server side scripting may also be utilized where a file is returned to the browser as plain HTML. At block 320, the HTML markup file is parsed to generate a DOM tree.

Figure 6:
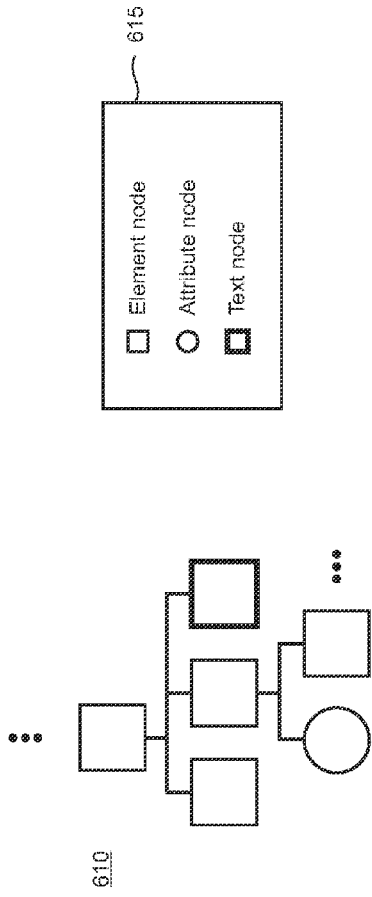
FIG. 6 shows an illustrative portion of a DOM tree.

FIG. 6 shows an illustrative portion 610 of a DOM tree which represents a web page as a group of connected nodes which include HTML elements, text elements, and attributes as indicated in the key 615. JAVASCRIPT can access the nodes through the tree to modify or delete their contents and create new elements. The nodes in the DOM tree have a hierarchical relationship to each other. The terms parent, child, and sibling are used to describe the relationships. Parent nodes have children. Children on the same level are called siblings.

Figure 7:
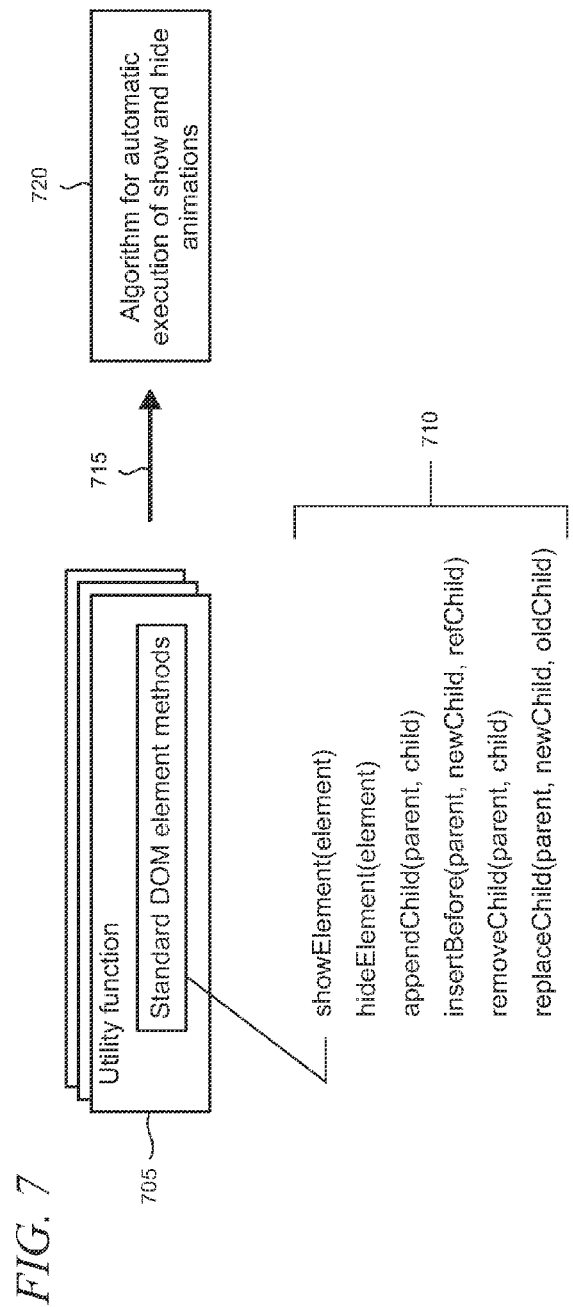
FIG. 7 shows an illustrative arrangement in which a set of utility functions are implemented which wrap standard DOM element methods supported in JAVASCRIPT.

Returning again to FIG. 3, at block 325 code is run on the client device web browser to build and render pages. At block 330, as JAVASCRIPT executes it can call methods to show, hide, add, and remove DOM tree elements. As shown in FIG. 7, a set of utility functions 705 wraps standard DOM element methods 710. However, it is noted that other functionalities beyond the standard DOM element methods may be used in some implementations. For example, a custom navigation or application model, or other code that manipulates the DOM tree to show and hide UI elements, may also call the utility functions to invoke declarative animations. Each utility function will internally invoke, as shown by the arrow 715, an algorithm 720 that automatically executes the show and hide animations. The set of utility functions 705 are described in more detail below:

showElement(element)—shows the passed element, executing all the show animations defined on the element and its descendents. The function returns a promise that is completed when the last show animation completes, or immediately if there are no defined show animations.

hideElement(element)—hides the passed element, executing all the hide animations defined on the element and its descendents. The function returns a promise that is completed when the last hide animation completes, or immediately if there are no defined hide animations.

appendChild(parent, child)—appends the passed child element to the passed parent element, executing all the show animations defined on the child element and all its descendents. The function returns a promise that is completed when the last show animation completes, or immediately if there are no defined show animations.

insertBefore(parent, newChild, refChild)—inserts the passed new child element after the passed refChild element in the passed parent element, executing all the show animations defined on the new child element and all its descendents. The function returns a promise that is completed when the last show animation completes, or immediately if there are no defined show animations.

removeChild(parent, child)—removes the passed child element from the passed parent element, executing all the hide animations defined on the child element and all its descendents. The function returns a promise that is completed when the last show animation completes, or immediately if there are no defined show animations. It is noted that the child element is not actually removed from the DOM tree until the last hide animation completes.

replaceChild(parent, newChild, oldChild)—replaces the passed old child element with the new child element within the passed parent element, executing all the hide animations defined on the old child element and all its descendents, after which all the show animations defined on the new child element and all its descendents are executed. The function returns a promise that is completed when the last animation completes, or immediately if there are no defined show or hide animations. It is noted that the old child element is not actually replaced in the DOM tree until the last associated hide animation completes.

Returning again to FIG. 3, at block 335, the algorithm invoked by the utility functions traverses the DOM tree for HTML elements that have the show and hide expando attributes. The CSS3 are then executed at block 340. Depending on the application logic, user interaction, and other typical factors, the steps at blocks 325, 330, 335, and 340 may be iterated, as shown at block 345. The method ends at block 350.

FIG. 8 shows a listing 810 of pseudo code of the algorithm that is invoked by the utility functions and used to automatically execute show and hide animations from the in-line markup. It is noted that the algorithm as shown in FIG. 8 supports the show animation case. The hide animation case (not shown) is substantially similar where the show animations are removed first, and then the hide animation classes are applied.

Figure 9:
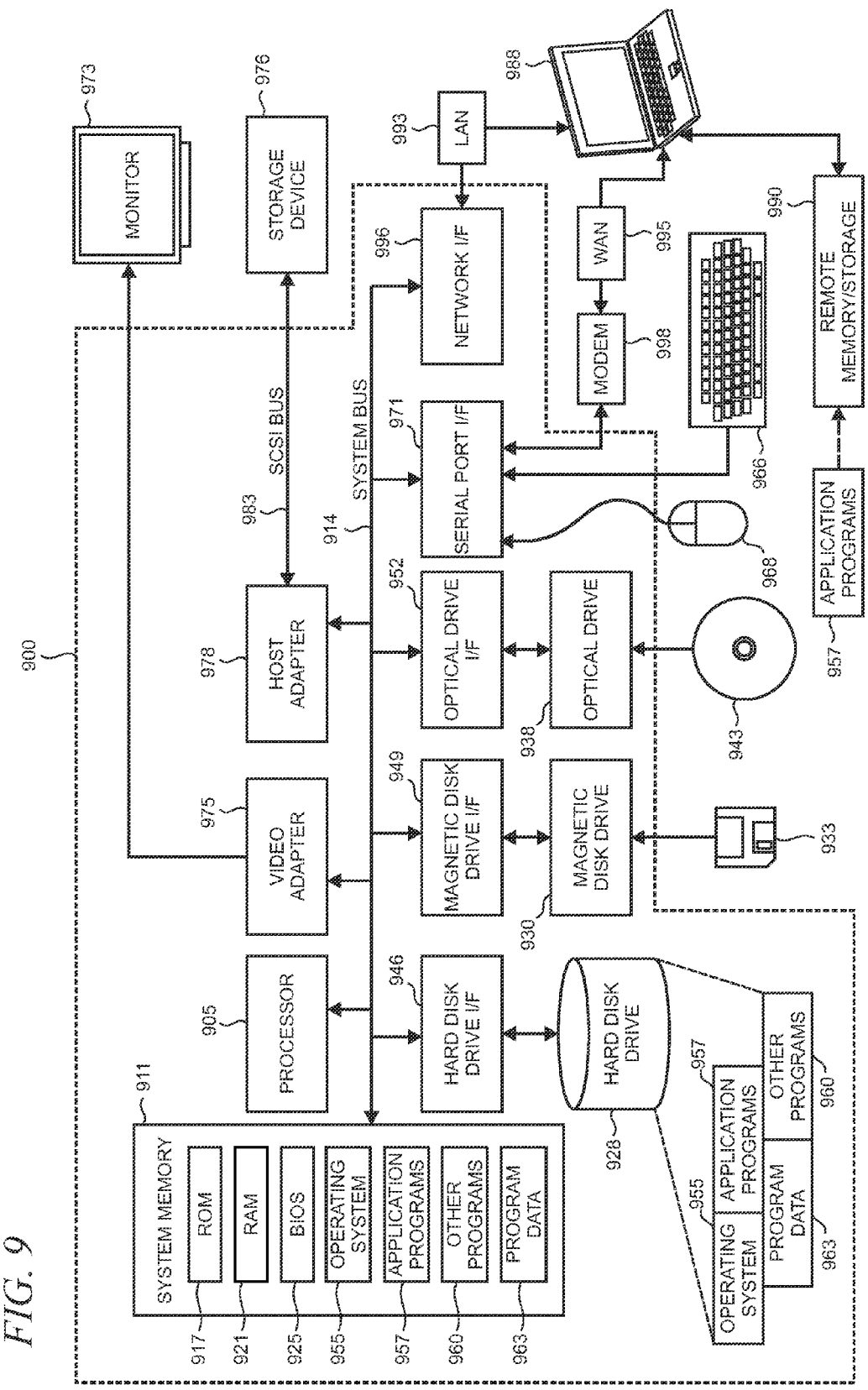
FIG. 9 is a simplified block diagram of an illustrative computer system such as a personal computer or server with which the present declarative show and hide animations may be implemented.

FIG. 9 is a simplified block diagram of an illustrative computer system 900 such as a PC or web server or other server with which the present declarative show and hide animations may be implemented. Computer system 900 includes a processor 905, a system memory 911, and a system bus 914 that couples various system components including the system memory 911 to the processor 905. The system bus 914 may be any of several types of bus structures including a memory bus or memory controller, a peripheral bus, or a local bus using any of a variety of bus architectures.

The system memory 911 includes read only memory ("ROM") 917 and random access memory ("RAM") 921. A basic input/output system ("BIOS") 925, containing the basic routines that help to transfer information between elements within the computer system 900, such as during start up, is stored in ROM 917. The computer system 900 may further include a hard disk drive 928 for reading from and writing to an internally disposed hard disk (not shown), a magnetic disk drive 930 for reading from or writing to a removable magnetic disk 933 (e.g., a floppy disk), and an optical disk drive 938 for reading from or writing to a removable optical disc 943 such as a CD (compact disc), DVD (digital versatile disc), or other optical media. The hard disk drive 928, magnetic disk drive 930, and optical disk drive 938 are connected to the system bus 914 by a hard disk drive interface 946, a magnetic disk drive interface 949, and an optical drive interface 952, respectively.

The drives and their associated computer-readable storage media provide non-volatile storage of computer readable instructions, data structures, program modules and other data for the computer system 900. Although this illustrative example shows a hard disk, a removable magnetic disk 933, and a removable optical disk 943, other types of computer-readable storage media which can store data that is accessible by a computer such as magnetic cassettes, flash memory cards, digital video disks, data cartridges, RAMs, ROMs, and the like may also be used in some applications of the present arrangement for declaratively showing and hiding animations. In addition, as used herein, the term computer readable medium includes one or more instances of a media type (e.g., one or more magnetic disks, one or more CDs, etc.).

A number of program modules may be stored on the hard disk, magnetic disk 933, optical disk 943, ROM 917, or RAM 921, including an operating system 955, one or more application programs 957, other program modules 960, and program data 963. A user may enter commands and information into the computer system 900 through input devices such as a keyboard 966 and pointing device 968 such as a mouse, or via voice using a natural user interface ("NUI") (not shown in FIG. 9).

Other input devices (not shown) may include a microphone, joystick, game pad, satellite disk, scanner, or the like. These and other input devices are often connected to the processor 905 through a serial port interface 971 that is coupled to the system bus 914, but may be connected by other interfaces, such as a parallel port, game port, or universal serial bus ("USB"). A monitor 973 or other type of display device is also connected to the system bus 914 via an interface, such as a video adapter 975.

In addition to the monitor 973, personal computers typically include other peripheral output devices (not shown), such as speakers and printers. The illustrative example shown in FIG. 9 also includes a host adapter 978, a Small Computer System Interface ("SCSI") bus 983, and an external storage device 976 connected to the SCSI bus 983.

The computer system 900 is operable in a networked environment using logical connections to one or more remote computers, such as a remote computer 988. The remote computer 988 may be selected as another personal computer, a server, a router, a network PC, a peer device or other common network node, and typically includes many or all of the elements described above relative to the computer system 900, although only a single representative remote memory/storage device 990 is shown in FIG. 9.

The logical connections depicted in FIG. 9 include a local area network ("LAN") 993 and a wide area network ("WAN") 995. Such networking environments are often deployed, for example, in offices, enterprise-wide computer networks, intranets and the Internet.

When used in a LAN networking environment, the computer system 900 is connected to the local area network 993 through a network interface or adapter 996. When used in a WAN networking environment, the computer system 900 typically includes a broadband modem 998, network gateway, or other means for establishing communications over the wide area network 995, such as the Internet. The broadband modem 998, which may be internal or external, is connected to the system bus 914 via the serial port interface 971.

In a networked environment, program modules related to the computer system 900, or portions thereof, may be stored in the remote memory storage device 990. It is noted that the network connections shown in FIG. 9 are illustrative and other means of establishing a communications link between the computers may be used depending on the specific requirements of a particular application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for enabling specification of style sheet animations within a markup language document, the method comprising the steps of:
   receiving the markup language document at a local server, the document including style sheet animations defined in-line using show and hide animation expando attributes associated with particular ones of markup language elements;

sending a set of functions to a remote client, the set of functions wrapping standard DOM (Document Object Model) element methods, the functions, when utilized on a client browser at runtime, invoking a show and hide animation algorithm; and sending the markup language document to the remote client device for parsing into a DOM tree at runtime, the show and hide animation algorithm being configured for querying the DOM tree to locate markup language elements having the show or hide animation expando attributes and executing the defined style sheet animations associated with the located markup language elements.

2. The method of claim 1 in which the show and hide animation algorithm is further configured for adding a style sheet class-name to a markup language element of the markup language elements and all descendent elements and includes style sheet class-names in an associated show animation expando attribute.

3. The method of claim 1 in which the show and hide animation algorithm is further configured for adding a style sheet class-name to a markup language element of the markup language elements and all descendent elements and includes style sheet class-names in an associated hide animation expando attribute.

4. The method of claim 1 in which the remote client device comprises one of mobile phone, e-mail appliance, smart phone, non-smart phone, PDA, PC, notebook PC, laptop PC, ultra-mobile PC, tablet device, tablet PC, handheld game device, game console, digital media player, digital camera, GPS navigation device, Internet-connect television, set-top box, or device which combines one or more features thereof.

5. A method for implementing Style Sheet animations in-line in a markup language document, the method comprising the steps of:

loading a markup language document in which the style sheet animations are defined in-line using show and hide animation expando attributes associated with markup language elements;

parsing the markup language document to generate a Document Object Model ("DOM") tree;

utilizing a set of utility functions that wrap DOM element methods, the utility functions, when utilized, invoking a show and hide animation algorithm;

traversing the DOM tree using an algorithm invoked by the set of utility functions to locate markup language elements having the show or hide animation expando attributes; and executing the defined style sheet animations associated with the located markup language elements.

6. The method of claim 5 in which the markup language is Hypertext Markup Language ("HTML") and the style sheet animations are Cascading Style Sheet ("CSS") animations.

7. The method of claim 5 in which the DOM element methods include one or more of showElement(element), hideElement(element), appendChild(parent, child), insertBefore(parent, newChild, refChild), removeChild(parent, child), and replaceChild(parent, newChild, oldChild).

8. The method of claim 5 in which the show and hide animation algorithm takes a DOM element and returns a promise that is completed when a last animation is completed.

9. The method of claim 5 in which, when showing animations,
the show and hide animation algorithm removes any existing hide animation classes so that all associated animations and transition names are removed before applying any show animation classes.

10. The method of claim 5 in which, when hiding animations, the show and hide animation algorithm removes any existing show animation classes so that all associated animations and transition names are removed before applying any hide animation classes.

11. A system for automatically executing style sheet animations from in-line markup language, the system comprising:

one or more computer-readable storage media; and a processor responsive to the computer-readable storage media and to a computer program, the computer program, when loaded into the processor, operable for
loading a markup language document in which the style sheet animations are defined in-line using show and hide animation expando attributes associated with markup language elements;

parsing the markup language document to generate a Document Object Model ("DOM") tree;

utilizing a set of utility functions that wrap DOM element methods, the utility functions, when utilized, invoking a show and hide animation algorithm;

traversing the DOM tree using an algorithm invoked by the set of utility functions to locate markup language elements having the show or hide animation expando attributes; and executing the defined style sheet animations associated with the located markup language elements.

12. The system of claim 11 in which the markup language is Hypertext Markup Language (HTML) and the style sheet animations are Cascading Style Sheet ("CSS") animations.

13. The system of claim 11 in which the DOM element methods include one or more of showElement(element), hideElement(element), appendChild(parent, child), insertBefore(parent, newChild, refChild), removeChild(parent, child), and replaceChild(parent, newChild, oldChild).

14. The system of claim 11 in which the show and hide animation algorithm takes a DOM element and returns a promise that is completed when a last animation is completed.

15. The system of claim 11 in which, when showing animations, the show and hide animation algorithm removes any existing hide animation classes so that all associated animations and transition names are removed before applying any show animation classes.

16. The system of claim 11 in which, when hiding animations, the show and hide animation algorithm removes any existing show animation classes so that all associated animations and transition names are removed before applying any hide animation classes.

* * * * *